(12) United States Patent
Akiyama et al.

(10) Patent No.: US 11,474,505 B2
(45) Date of Patent: Oct. 18, 2022

(54) WORK SUPPORT SYSTEM AND WORK SUPPORT METHOD

(71) Applicant: Hitachi, Ltd., Tokyo (JP)

(72) Inventors: Takayuki Akiyama, Tokyo (JP); Mitsuhiro Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 39 days.

(21) Appl. No.: 17/119,388

(22) Filed: Dec. 11, 2020

(65) Prior Publication Data

US 2021/0294311 A1 Sep. 23, 2021

(30) Foreign Application Priority Data

Mar. 23, 2020 (JP) .............................. JP2020-051389

(51) Int. Cl.
*G05B 19/418* (2006.01)
*G06V 20/40* (2022.01)

(52) U.S. Cl.
CPC ....... *G05B 19/41875* (2013.01); *G06V 20/41* (2022.01); *G05B 2219/32368* (2013.01); *G06V 20/44* (2022.01)

(58) Field of Classification Search
CPC .... G05B 19/41875; G05B 2219/32368; G05B 2219/2612; G06V 10/454; G06V 20/41; G06V 20/44; G06V 20/52; G06K 9/6271
See application file for complete search history.

(56) References Cited

U.S. PATENT DOCUMENTS

| 2019/0114941 A1* | 4/2019 | Shimaoka | ............... G06F 3/167 |
| 2019/0251338 A1* | 8/2019 | Yamauchi | ............ G06K 9/6262 |
| 2020/0160047 A1* | 5/2020 | Nishi | ........................ G06F 3/14 |

FOREIGN PATENT DOCUMENTS

| CN | 113302633 A * | 8/2021 | ............... B65F 1/14 |
| JP | 2019-075009 A | 5/2019 | |
| WO | WO-2020240918 A1 * | 12/2020 | |

* cited by examiner

*Primary Examiner* — Nizar N Sivji
(74) *Attorney, Agent, or Firm* — Mattingly & Malur, PC

(57) ABSTRACT

A work support system is capable of avoiding situations where a worker performs erroneous work. The system includes an identification unit which identifies a target of an inquiry from a worker based on a video acquired by an imaging device, a selection unit which selects determination model information corresponding to each of one or more targets of inquiry identified by the identification unit from a storage unit storing determination model information to be used in a determination model. A determination unit determines whether each of the targets of inquiry is correct by using each of the determination models in which the determination model information, which was selected by the selection unit, corresponding to each of the one or more targets of inquiry identified by the identification unit, has been set in the determination model. An output unit outputs a determination result of the determination unit.

6 Claims, 14 Drawing Sheets

FIG.3

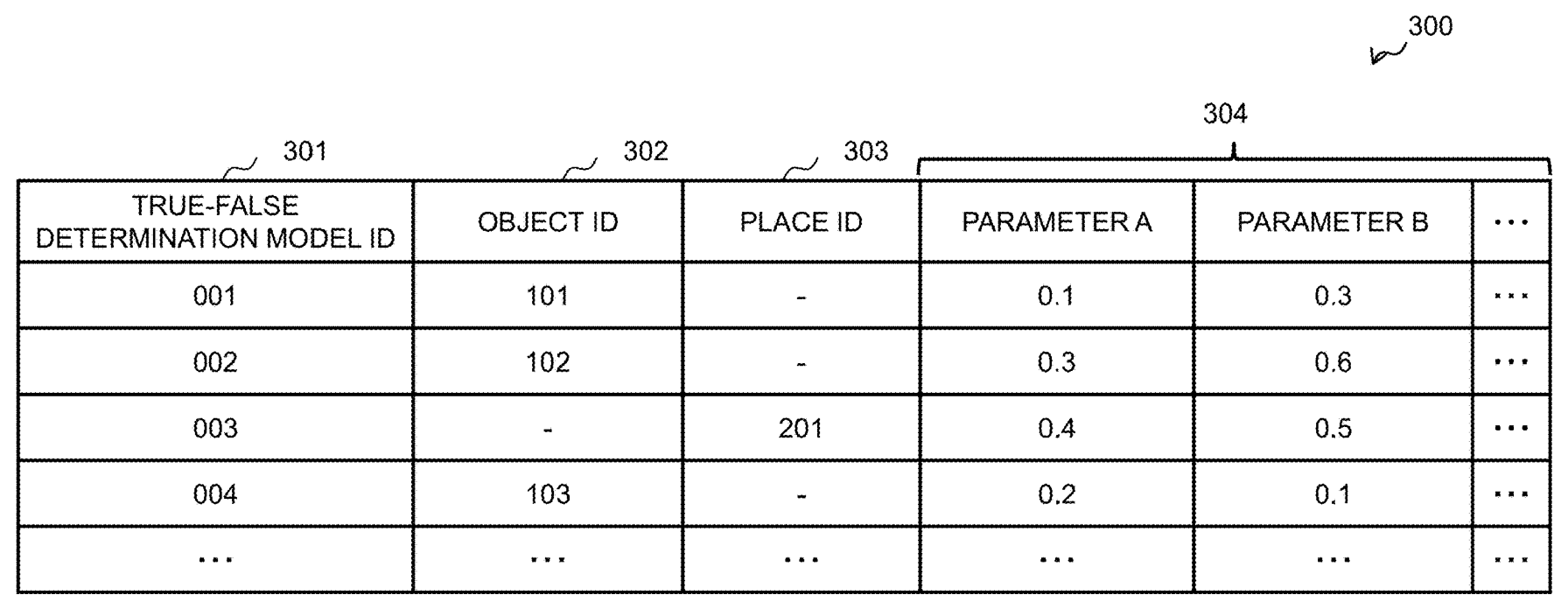

| TRUE-FALSE DETERMINATION MODEL ID | OBJECT ID | PLACE ID | PARAMETER A | PARAMETER B |
|---|---|---|---|---|
| 001 | 101 | - | 0.1 | 0.3 |
| 002 | 102 | - | 0.3 | 0.6 |
| 003 | - | 201 | 0.4 | 0.5 |
| 004 | 103 | - | 0.2 | 0.1 |
| ... | ... | ... | ... | ... |

FIG.4
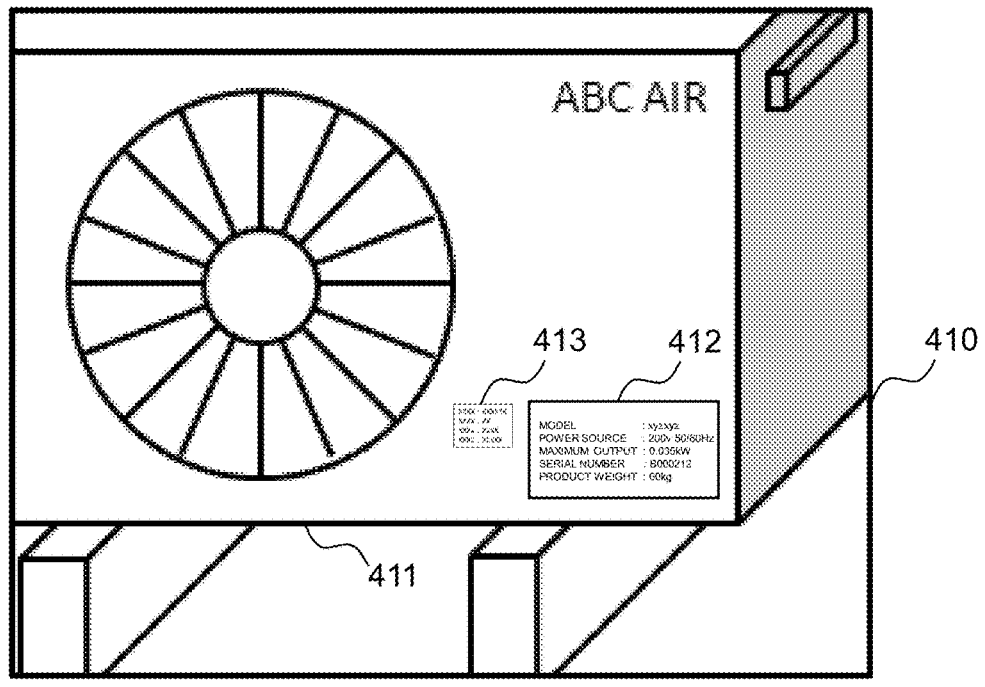
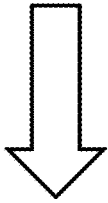
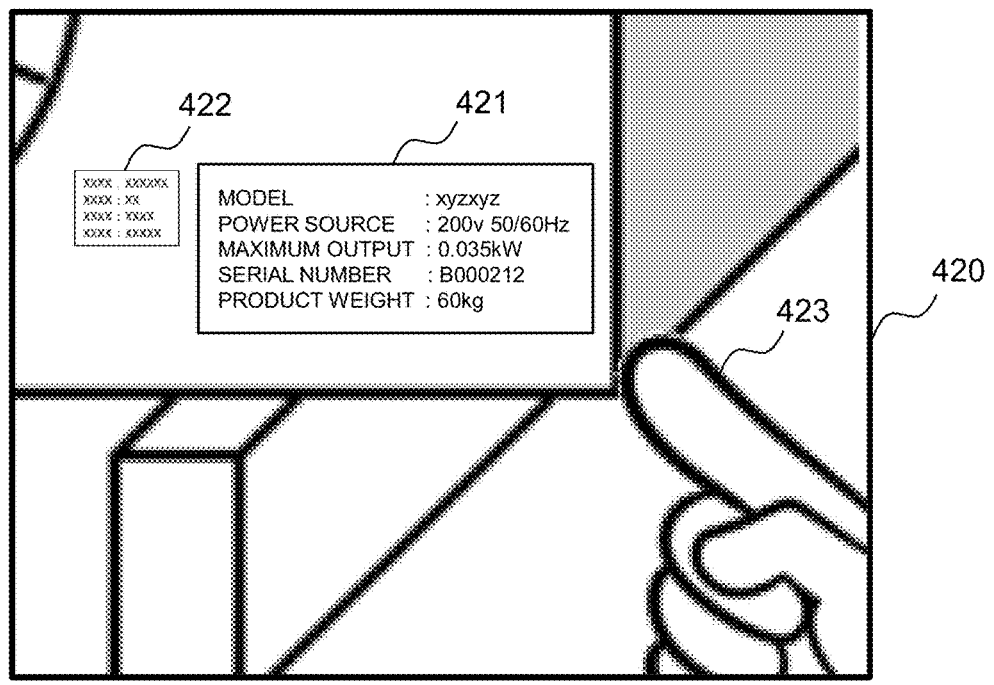

FIG.7

| WORK ID /701 | WORK ITEM ID /702 | OBJECT ID /703 | PLACE ID /704 |
|---|---|---|---|
| A | 1 | 101 | 201 |
| A | 2 | 101,102 | 201 |
| A | 3 | 103 | 201 |
| B | 1 | 101,104 | 202 |
| ... | ... | ... | ... |

…

WORK SUPPORT SYSTEM AND WORK SUPPORT METHOD

CROSS-REFERENCE TO RELATED APPLICATION

The present application claims priority from Japanese application JP2020-051389, filed on Mar. 23, 2020, the contents of which is hereby incorporated by reference into this application.

TECHNICAL FIELD

The present invention generally relates to a technology for avoiding situations where a worker performs erroneous work.

BACKGROUND ART

A worker engaged in the manufacture, inspection, testing, maintenance and other work in a factory or a building performs such work while wearing a microphone, a camera or the like. A worker performs work according to the description instructed from a server device and, after completing the work, uses the microphone, camera or the like to notify the server device that the work has been completed. The server device thereafter determines whether the work has been completed normally.

In this regard, disclosed is a work support system which determines the quality of the work description in a process to be evaluated among a plurality of processes based on an image of a work area, and notifies the worker when the work description of the process to be evaluated is determined to be inferior (refer to PTL 1).

CITATION LIST

Patent Literature

[PTL 1] Japanese Unexamined Patent Application Publication No. 2019-75009

SUMMARY OF THE INVENTION

Problems to be Solved by the Invention

With the work support system described in PTL 1, while the quality of the work is evaluated after the work is performed, since the work support system does not support the worker in performing the work before the work is performed, there is a possibility that the worker may perform erroneous work.

The present invention was devised in view of the foregoing point, and an object of this invention is to propose a work support system capable of avoiding situations where a worker performs erroneous work.

Means to Solve the Problems

In order to achieve the foregoing object, the present invention provides a work support system which includes an identification unit which identifies a target of an inquiry from a worker based on a video acquired by an imaging device, a selection unit which selects determination model information corresponding to each of one or more targets of inquiry identified by the identification unit from a storage unit storing determination model information to be used in a determination model for determining whether the target of inquiry is correct for each target of inquiry, a determination unit which determines whether each of the targets of inquiry is correct by using each of the determination models in which the determination model information, which was selected by the selection unit, corresponding to each of the one or more targets of inquiry identified by the identification unit has been set in the determination model, and an output unit which outputs a determination result of the determination unit.

With the foregoing configuration, a target of an inquiry is detected, determination model information corresponding to the detected target of inquiry is selected, and a determination model in which the selected determination model information has been set is used to determine whether the target of inquiry is correct. According to the foregoing configuration, for example, since a worker can make an inquiry and confirm the work to be performed before actually performing the work, it is possible to avoid situations where a worker performs erroneous work. Accordingly, as a result of the work support system supporting the worker so that work is correctly performed, it is possible to reduce erroneous work, and the worker can perform work efficiently.

Advantageous Effects of the Invention

According to the present invention, it is possible to avoid situations where a worker performs erroneous work.

BRIEF DESCRIPTION OF DRAWINGS

FIG. 3 is a diagram showing an example of the true-false determination model information according to the first embodiment.

FIG. 4 is a diagram showing an example of an inquiry according to the first embodiment.

FIG. 7 is a diagram showing an example of the work object management information according to the second embodiment.

DESCRIPTION OF EMBODIMENTS (1) First Embodiment

Figure 1:
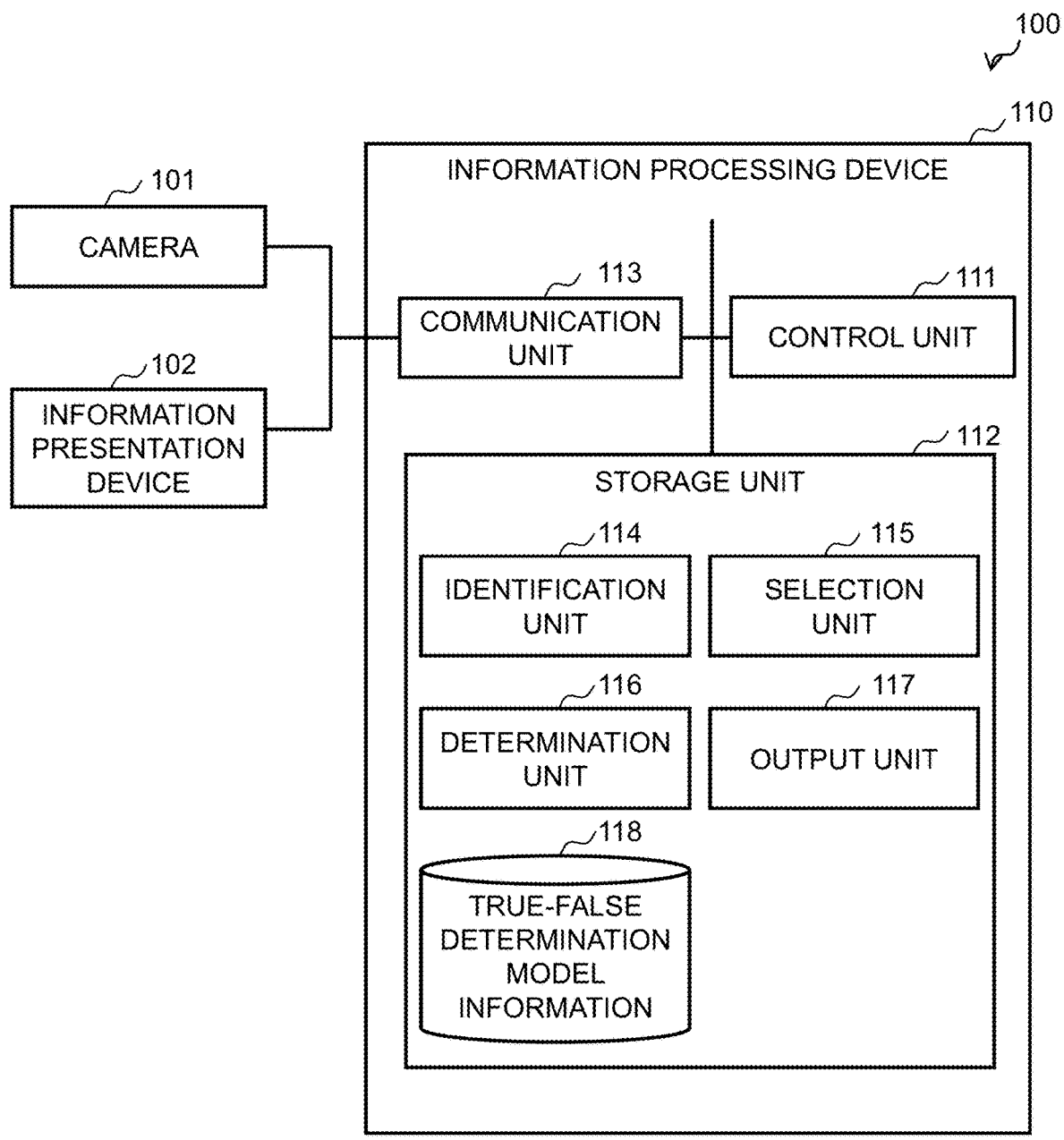
FIG. 1 is a diagram showing an example of the configuration of the work support system according to the first embodiment.

An embodiment of the present invention is now explained in detail. In this embodiment, a configuration capable of avoiding situations where a worker performs erroneous work is explained. However, the present invention is not limited to this embodiment.

The work support system shown in this embodiment, for example, gives instructions regarding the work description to a worker. The work support system detects a target of an inquiry from a worker, for example, based on a video recorded with a camera.

As the target of inquiry, considered may be at least one of either a work-related object or a work-related action. A work-related object is a work-related article or a work-related spot. A work-related article is, for example, a component such as a screw to be used in the work, or a tool such as a screw driver for tightening the screw. A work-related spot is, for example, a position where a component such as a threaded screw hole of a screw is to be used, or equipment on which a component is to be mounted. A work-related action is, for example, an action of using a tool, or an action of using equipment. Note that, when there is no need to differentiate the article and the spot, the term "object" may be used.

For example, when the worker has placed a screw near the camera, the work support system detects that the worker is making an inquiry regarding whether that screw is the correct screw (inquiry regarding an article). For example, when the worker has placed a threaded screw hole near the camera, the work support system detects that the worker is making an inquiry regarding whether that threaded screw hole is the correct threaded screw hole for the work (inquiry regarding a spot). Moreover, for example, when the worker is making an action of tightening a screw toward the camera, the work support system detects that the worker is making an inquiry regarding whether that action is the correct action for the work (inquiry regarding an action).

Moreover, the work support system comprises information (hereinafter sometimes referred to as the "parameter") of a model capable of determining the true-false of the target of inquiry (hereinafter referred to as the "true-false determination model") in correspondence with each of the various types of targets of inquiry. The work support system determines the true-false of the target of inquiry by using a true-false model set with the parameter corresponding to that target of inquiry. The work support system thereafter presents the true-false result to the worker.

With the foregoing configuration, the worker can make an inquiry and receive a reply to that inquiry before starting one's work. For example, when the inquired content is erroneous, a situation where the worker performs erroneous work can be avoided by the worker making inquiries until the worker is able to confirm the correct work description.

Moreover, for example, a worker who is not familiar with the work or a worker who is not confident with the work can confirm the details of the work description. Consequently, the worker will be able to confirm in advance whether the tool to be used in the work, the equipment to be used in the work, and the operation method of such tool and equipment are correct before actually performing the work, and thereby efficiently perform the work.

An embodiment of the present invention is now explained with reference to the appended drawings. In FIG. 1, reference numeral "100" represents the work support system of the first embodiment.

FIG. 1 is a diagram showing an example of the configuration of the work support system 100.

The work support system 100 comprises a camera 101, an information presentation device 102, and an information processing device 110.

The camera 101 is a compact video camera which is mounted, for example, on the worker's body or the worker's helmet, and is capable of recording video in a hands-free manner. The camera 101 is, for example, a pair of smartglasses, a wearable camera, or an action camera. The camera 101 records a video of the object that the worker is viewing as the first person. The camera 101 comprises an imaging unit and a microphone, and acquires contents related to the work inquiry such as the work-related object, the work-related action, and the worker's utterance.

The information presentation device 102 is a compact output device which is mounted, for example, on the worker's body or the worker's helmet, and is capable of presenting information. The information presentation device 102 is, for example, a speaker, an HMD (Head Mounted Display), or a smartphone. The information presentation device 102 presents, to the worker, information such as the work description instructed by the information processing device 110, and the true-false result of the inquiry in the information processing device 110.

Note that the housing of the camera 101 and the housing of the information presentation device 102 may be separate, or integrated.

The information processing device 110 comprises a control unit 111, a storage unit 112, and a communication unit 113.

The control unit 111 is a device which performs operation processing. The control unit 111 is, for example, a CPU (Central Processing Unit), an MPU (Micro Processing Unit), a GPU (Graphics Processing Unit), or an AI (Artificial Intelligence) chip.

The storage unit 112 is at least one of either a main storage device or an auxiliary storage device. The storage unit 112 is typically a main storage device.

The main storage device is a device which stores programs, data and the like. The main storage device is, for example, a ROM (Read Only Memory), or a RAM (Random Access Memory). The ROM is, for example, an SRAM (Static Random Access Memory), an NVRAM (Non Volatile RAM), a Mas ROM (Mask Read Only Memory), or a PROM (Programmable ROM). The RAM is, for example, a DRAM (Dynamic Random Access Memory).

The auxiliary storage device is, for example, an HDD (Hard Disk Drive), a Flash Memory, an SSD (Solid State Drive), or an optical storage device. The optical storage device is, for example, a CD (Compact Disc), or a DVD (Digital Versatile Disc). The programs, data and the like stored in the auxiliary storage device are read into the main storage device as needed.

The communication unit 113 is a communication interface for communicating with other devices. The communication unit 113 is, for example, a wireless communication module, an NIC (Network Interface Card), a USB (Universal Serial Interface) module, or a serial communication module. The communication unit 113 can also function as a device which receives information from other devices which are communicably connected. Moreover, the communication unit 113 can also function as a device which sends information to other devices which are communicably connected.

The information processing device 110 may comprise at least one of either an input device or an output device.

The input device is a user interface which receives information from a user. The input device is, for example, a keyboard, a mouse, a card reader, or a touch panel. The output device is a user interface which outputs (display output, voice output, print output, etc.) various types of information. The output device is, for example, a display device, a voice output device (speaker), or a printing device which visualizes various types of information. The display device is, for example, an LCD (Liquid Crystal Display), or a graphic card.

Note that the information processing device 110 may be mounted on the camera 101, or mounted on the information presentation device 102. Moreover, the information processing device 110 may be installed at the same place as the place where the worker is working, or installed at a place that is different from the place where the worker is working.

The various functions of the information processing device 110 are realized by the control unit 111 reading and executing the programs stored in the storage unit 112, or with the hardware (FPGA, ASIC, AI chip, etc.) configuring the information processing device 110. As the functions of the information processing device 110, there are, for example, an identification unit 114, a selection unit 115, a determination unit 116, and an output unit 117. The information processing device 110 may further comprise, in addition to the foregoing functions, for example, functions of an operating system, a device driver, a file system, and a DBMS (DataBase Management System).

The identification unit 114 identifies the target of inquiry from the worker based on the video acquired by the camera 101.

The selection unit 115 selects information of the true-false determination model of the target of inquiry identified by the identification unit 114 from true-false determination model information 118. Note that the true-false determination model information 118 will be described later with reference to FIG. 3.

The determination unit 116 determines whether the target of inquiry identified by the identification unit 114 is correct by using the information of the true-false determination model selected by the selection unit 115 and the video acquired by the camera 101.

The output unit 117 outputs the determination result of the determination unit 116.

Figure 2:
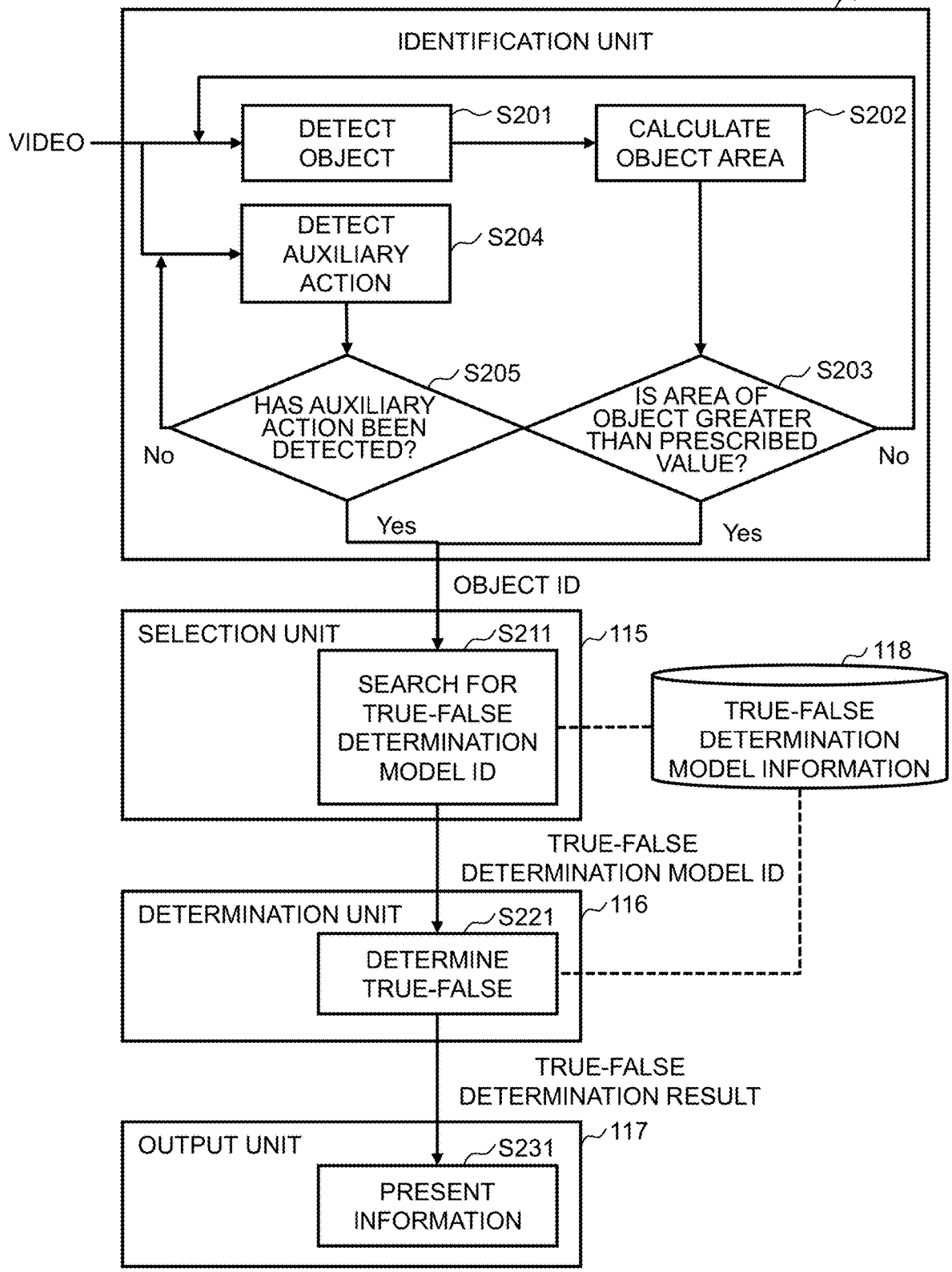
FIG. 2 is a diagram showing an example of the processing performed by the information processing device according to the first embodiment.

FIG. 2 is a diagram showing an example of the processing performed by the information processing device 110. The information processing device 110 is constantly receiving a video from the camera 101.

Foremost, the identification unit 114 performs the processing of S201 to S205, and identifies a target of an inquiry from a worker.

In S201, the identification unit 114 detects an object to be detected (hereinafter referred to as the "specific object") which is registered in the storage unit 112 based on the video of the camera 101. More specifically, the identification unit 114 detects the specific object by using the video received from the camera 101 (respective images sent at a prescribed frame rate) and the object detection model. Here, the identification unit 114 receives, from the object detection model, an object ID which is identification information capable of identifying the detected object.

As the object detection model, known technology such as SSD (Single Shot MultiBox Detector) may be used. Note that, with the object detection model, when the input image contains a plurality of specific objects, a plurality of specific objects are detected. Note that, while processing is performed for each object of inquiry in S202, S203, S211, S221, and S231, a case where one object of inquiry has been detected is mainly explained below to simplify the explanation.

In S202, the identification unit 114 calculates the area of the detected object. For example, the identification unit 114 calculates the size (number of pixels) of the detected object on the image. For example, the identification unit 114 calculates the size of the bounding box, which is the area of cutting out the object from the image.

In S203, the identification unit 114 determines whether the area of the detected object is greater than a prescribed value (whether the worker is making an inquiry regarding the detected object). When the identification unit 114 determines that the worker is making an inquiry regarding the detected object, the identification unit 114 identifies the detected object as the target of inquiry and proceeds to the processing of S211. Meanwhile, when the identification unit 114 determines that the worker is not making an inquiry regarding the detected object, the identification unit 114 returns to the processing of S201. Note that the storage unit 112 stores a prescribed value for each object ID of the detected object.

Here, when the size of the detected object on the image is greater than a prescribed value, this means that the worker is zooming in on the detected object, and indicates that the worker is making an inquiry regarding the detected object.

Note that, while the processing of comparing the area of the detected object with a prescribed value was shown in S203, the processing of S203 is not limited to the foregoing processing. For example, the processing of S203 may also be the processing of comparing the ratio that the area of the detected object accounts for in the image with a prescribed value.

Moreover, for example, when the detected object is a work-related spot, the identification unit 114 does not need to perform the processing of S202 and S203.

In S204, the identification unit 114 detects an action of a worker for assisting the confirmation of the specific object stored in the storage unit 112 (hereinafter referred to as the "specific auxiliary action") from the video of the camera 101. More specifically, the identification unit 114 detects the specific auxiliary action by using the images of the video of a predetermined time received from the camera 101, and the moving image recognition model. As the specific auxiliary action, considered may be "finger-pointing" where the worker points his/her finger toward the object of inquiry.

As the moving image recognition model, known technology such as CNN (Convolutional Neural Network) may be used.

In S205, the identification unit 114 determines whether a specific auxiliary action has been detected. When the identification unit 114 detects a specific auxiliary action and determines that the object of inquiry has been identified, the identification unit 114 proceeds to the processing of S211. Meanwhile, when the identification unit 114 determines that at least either the specific auxiliary action or the specific object has not been detected, the identification unit 114 returns to the processing of S204.

Accordingly, when the worker is unable to move the object of inquiry, does not know the name of the object of inquiry, is unable to get near the object of inquiry, or is unable to touch the object of inquiry, the work support system 100 assists the identification of the object of inquiry by detecting a specific auxiliary action.

Next, the selection unit 115 performs the processing of S211, and selects information capable of identifying the parameter to be set in the true-false determination model. The true-false determination model is, for example, a neural network such as CNN.

In S211, the selection unit 115 searches for the true-false determination model ID of the true-false determination model which is linked to the object ID (article ID or spot ID) of the object of inquiry from the true-false determination model information 118 stored in the storage unit 112. Note that the true-false determination model information 118 will be explained later with reference to FIG. 3.

In S221, the determination unit 116 of the information processing device 110 inputs the image, in which the object has been detected, to the true-false determination model set with the parameter of the model ID selected by the selection unit 115, and determines whether the identified object; that is, the object of inquiry, is correct.

In S231, the output unit 117 of the information processing device 110 sends, to the information presentation device 102, information indicating the determination result of the determination unit 116. The information presentation device 102 presents the received result to the worker. The information presentation device 102 outputs, for example, information such as "That's correct" or "That's incorrect" with regard to the target of inquiry. Note that the output may be a voice-based output or a display-based output, or an output of any other mode.

FIG. 3 is a diagram showing an example (true-false determination model information table 300) of the true-false determination model information 118.

The true-false determination model information table 300 stores, for each true-false determination model, the parameters set in the true-false determination model. More specifically, the true-false determination model information table 300 stores information (records) in which a true-false determination model ID 301, an article ID 302, a spot ID 303, and one or more parameters 304 are associated.

The true-false determination model ID 301 is identification information capable of identifying the true-false determination model. The article ID 302 is identification information capable of identifying a work-related article that can be determined with the true-false determination model. The spot ID 303 is identification information capable of identifying a work-related spot that can be determined with the true-false determination model. The parameter 304 is a parameter (for example, information indicating the weight in the neural network) that is set in the true-false determination model.

For example, when the object ID received from the identification unit 114 has an article ID "102", the selection unit 115 refers to the column of the article ID 302, and selects the value "002" of the true-false determination model ID 301 of the record which includes the article ID "102".

FIG. 4 is a diagram showing an example of an inquiry. FIG. 4 shows that the worker is making an inquiry by zooming in on the object of inquiry and pointing his/her finger to the object of inquiry.

For example, when the worker is engaged in the work of confirming a label attached to a product, the worker approaches the label and performs an action of pointing one's finger to the label if the worker wishes to confirm whether the label to be confirmed is the correct label.

An image 410 is an example of the image before the worker makes an inquiry. The image 410 includes a product image 411 showing a product, a label image 412 showing a first label, and a label image 413 showing a second label.

An image 420 is an example of the image when the worker is making an inquiry. The image 420 includes a label image 421 in which the label image 412 has been zoomed in, a label image 422 in which the label image 413 has been zoomed in, and a finger-pointing image 423 showing the worker's finger-pointing.

In this example, the first label and the second label are detected as the specific objects as a result of S201 being performed regarding the image 420. Moreover, S202 and S203 are performed, and the area of the label image 421 and the label image 422 is determined to be greater than a prescribed value.

Moreover, in parallel with the foregoing process, finger-pointing is detected as a specific auxiliary action as a result of S204 being performed for a series of images from the image 410 to the image 420.

Subsequently, in S205, the first label that is the subject of finger-pointing is identified as the target of inquiry. In other words, while the image 420 includes a label image 413 of the second label which differs from the first label, as a result of the worker's finger being pointed to the first label, it is determined that the object of inquiry is the first label.

Next, in S211, the true-false determination model ID of the true-false determination model corresponding to the first label is selected. Next, in S221, the parameter linked to the selected true-false determination model ID is set in the true-false determination model, the image 420 is input to the true-false determination model, and whether the first label that was subject to the worker's finger-pointing is the label to be confirmed is determined. Next, in S231, the determination result is presented to the worker.

According to this embodiment, since the worker can make an inquiry and confirm the work to be performed before actually performing the work, it is possible to avoid situations where the worker performs erroneous work. Moreover, according to this embodiment, the worker can avoid the trouble of manually confirming the object of inquiry by reading a manual.

(2) Second Embodiment

This embodiment mainly differs from the first embodiment with respect to the point that the targets of inquiry are narrowed down based on the working conditions. In this embodiment, any configuration that is the same as the first embodiment is given the same reference numeral, and the explanation thereof is omitted as appropriate.

Figure 5:
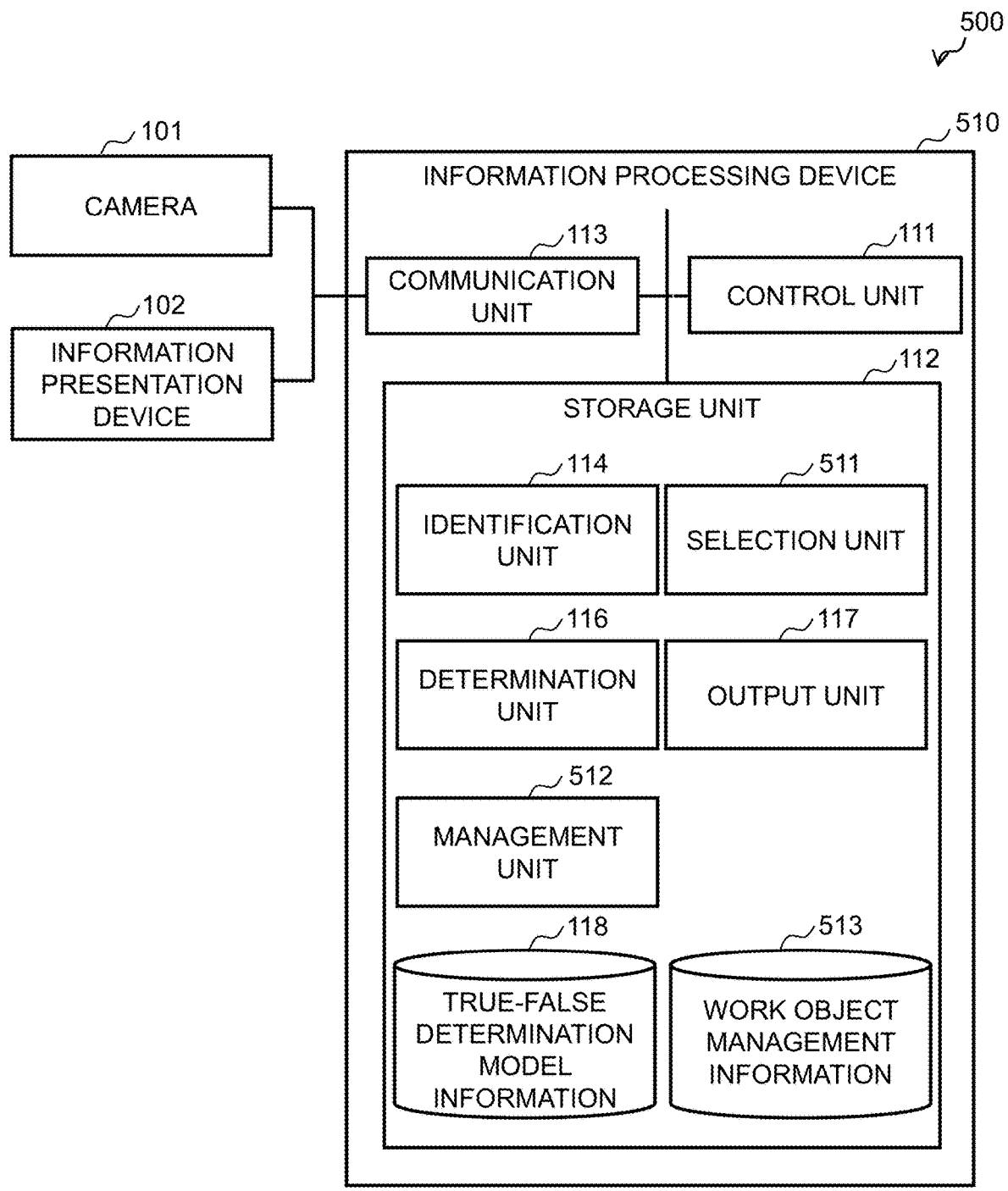
FIG. 5 is a diagram showing an example of the configuration of the work support system according to the second embodiment.

FIG. 5 is a diagram showing an example of the configuration of the work support system 500 according to this embodiment.

The information processing device 510 comprises a selection unit 511, a management unit 512, work object management information 513 and the like. Note that, in addition to the function of the selection unit 115, the selection unit 511 has the function of selecting an object ID related to the current work among the object IDs identified by the identification unit 114.

The management unit 512 manages the work performed by the worker. The management unit 512 determines whether the items configuring the work (hereinafter referred to as the "work items") have been performed normally based on information sent from the worker to the effect that the work items have been completed. The management unit 512 refers to the work object management information 513, identifies the object ID (article ID, spot ID or the like) of the object related to the next work item, and notifies the identified object ID to the selection unit 115 as the current work information related to the current work. Note that the work object management information 513 will be explained later with reference to FIG. 7.

Figure 6:
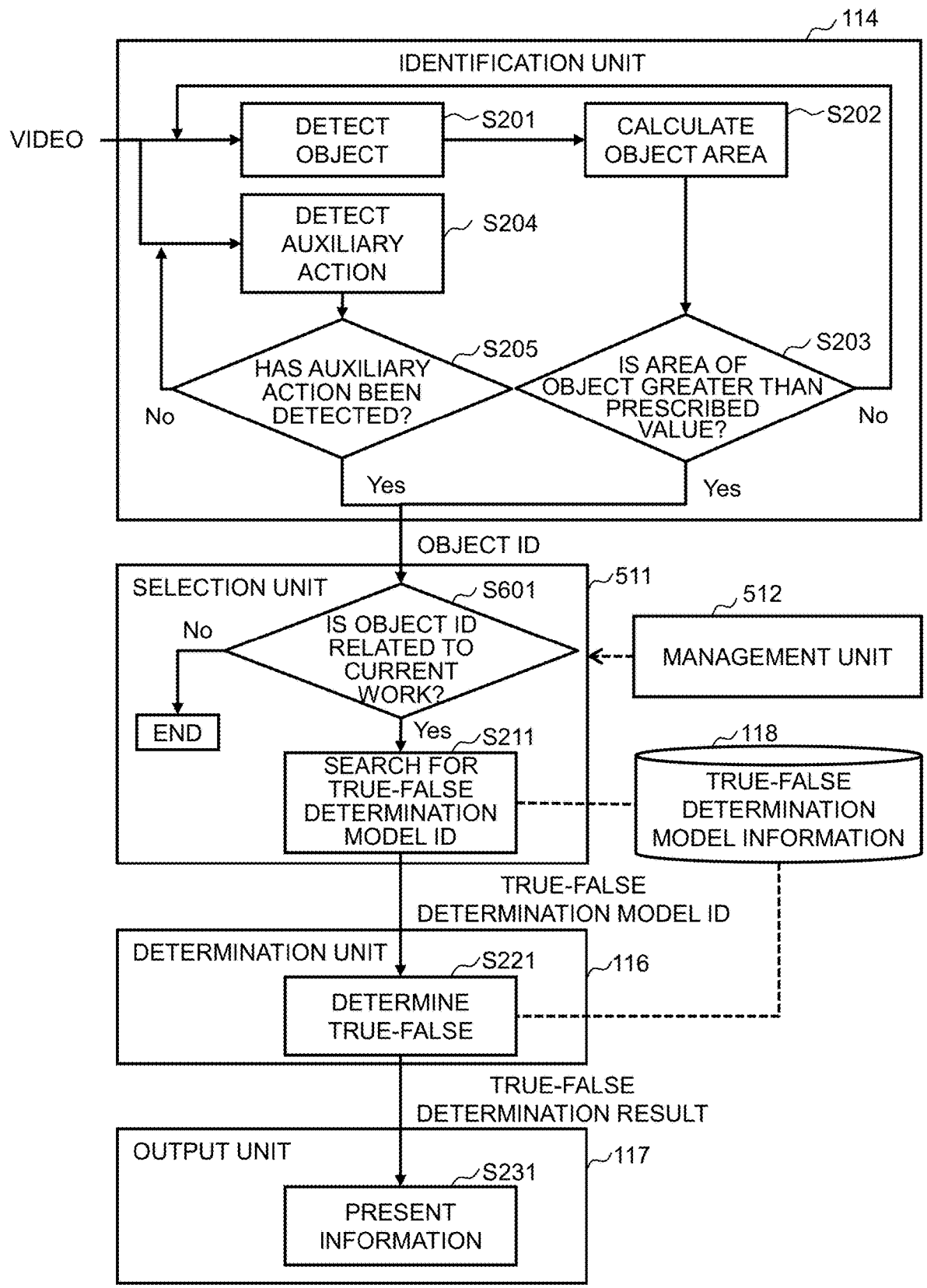
FIG. 6 is a diagram showing an example of the processing performed by the information processing device according to the second embodiment.

FIG. 6 is a diagram showing an example of the processing performed by the information processing device 510.

In S601, the selection unit 115 determines whether the object ID identified by the identification unit 114 is an object ID related to the current work (whether the identified object is an object related to the current work) based on the current work information notified by the management unit 512. When the selection unit 115 determines that the identified object is an object related to the current work, the selection unit 115 proceeds to the processing of S211. Meanwhile, when the selection unit 115 determines that the identified object is not an object related to the current work, the selection unit 115 ends the processing regarding that object.

Note that the work support system 500 may also comprise a configuration of sending, to the information presentation device 102, information indicating that the identified object is not an object related to the current work when it is determined that the identified object is not an object related to the current work.

The work object management information 513 is now explained with reference to FIG. 7.

FIG. 7 is a diagram showing an example (work object management table 700) of the work object management information 513.

The work object management table 700 stores, for each work item, information capable of identifying an object related to the work item. More specifically, the work object management table 700 stores information (records) in which a work ID 701, a work item ID 702, an article ID 703, and a spot ID 704 are associated.

The work ID 701 is identification information capable of identifying the work which includes the corresponding work item. The work item ID 702 is identification information capable of identifying the corresponding work item. The article ID 703 is identification information capable of identifying the article(s) related to the corresponding work item. The spot ID 704 is identification information capable of identifying the spot related to the corresponding work item.

Note that, while the work has been explained by taking a configuration example which includes one or more work items, the work is not limited to the foregoing configuration. For example, the work may be configured by not including any work items, or configured such that the work items additionally include a plurality of specified items.

In this embodiment, even if an object that is unrelated to the current work is identified, since such object is excluded based on the current work and the objects of inquiry are thereby narrowed down appropriately, it is possible to more accurately determine the object of inquiry.

(3) Third Embodiment

This embodiment mainly differs from the first embodiment with regard to the point that the action which caused the erroneous work (hereinafter referred to as the "causative action") is detected and the worker is urged to make an inquiry. In this embodiment, any configuration that is the same as the first embodiment is given the same reference numeral, and the explanation thereof is omitted as appropriate.

As the causative action, considered may be the worker looking away from the work-related object, or the worker reaching out to an object that is different from the work-related object.

Figure 8:
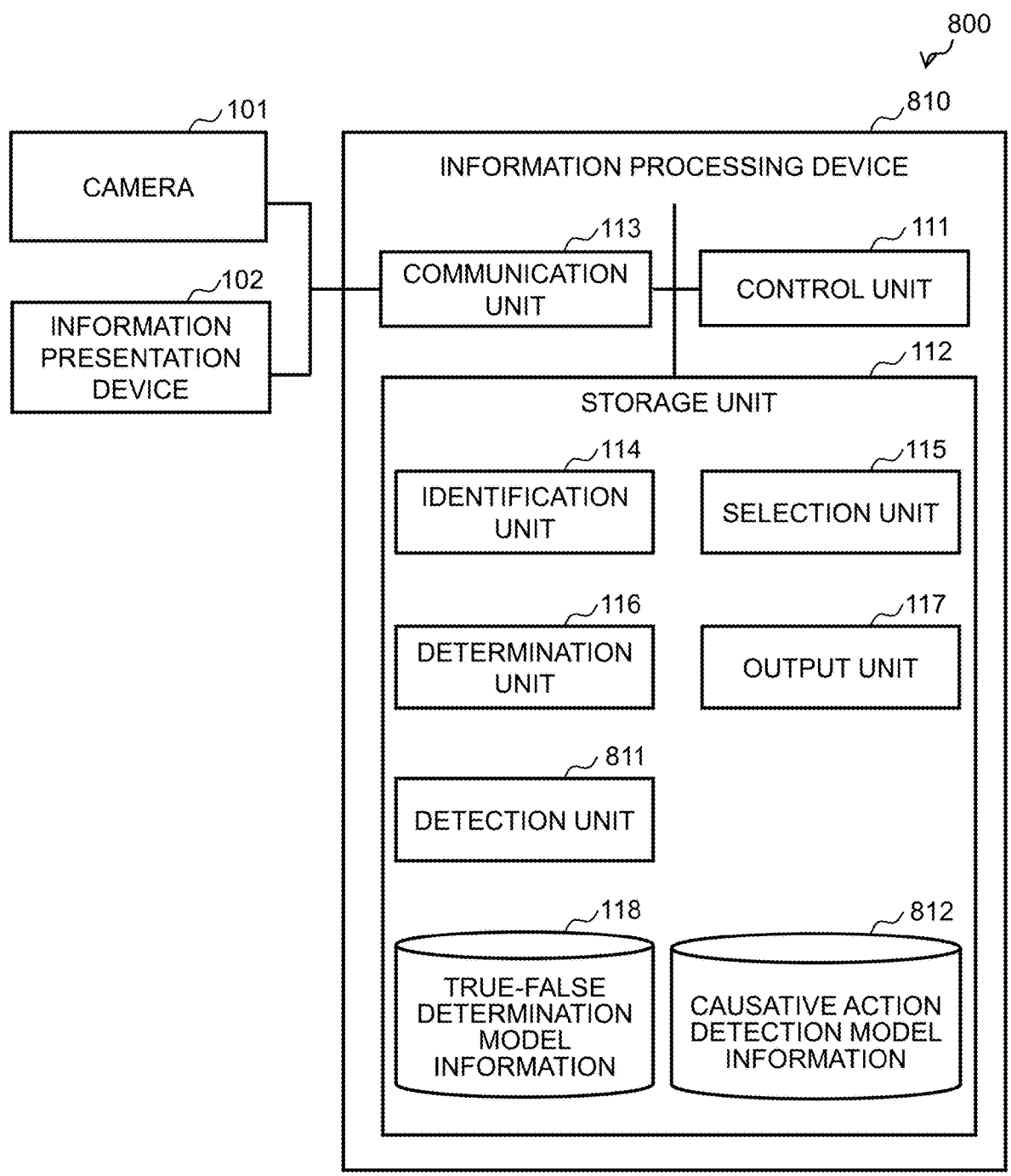
FIG. 8 is a diagram showing an example of the configuration of the work support system according to the third embodiment.

FIG. 8 is a diagram showing an example of the configuration of the work support system 800 according to this embodiment.

The information processing device 810 comprises a detection unit 811, causative action detection model information 812, and the like. The detection unit 811 detects the causative action by using a causative action detection model capable of detecting a causative action. The causative action detection model is, for example, a neural network such as CNN. The causative action detection model information 812 stores the parameter of the causative action detection model.

Figure 9:
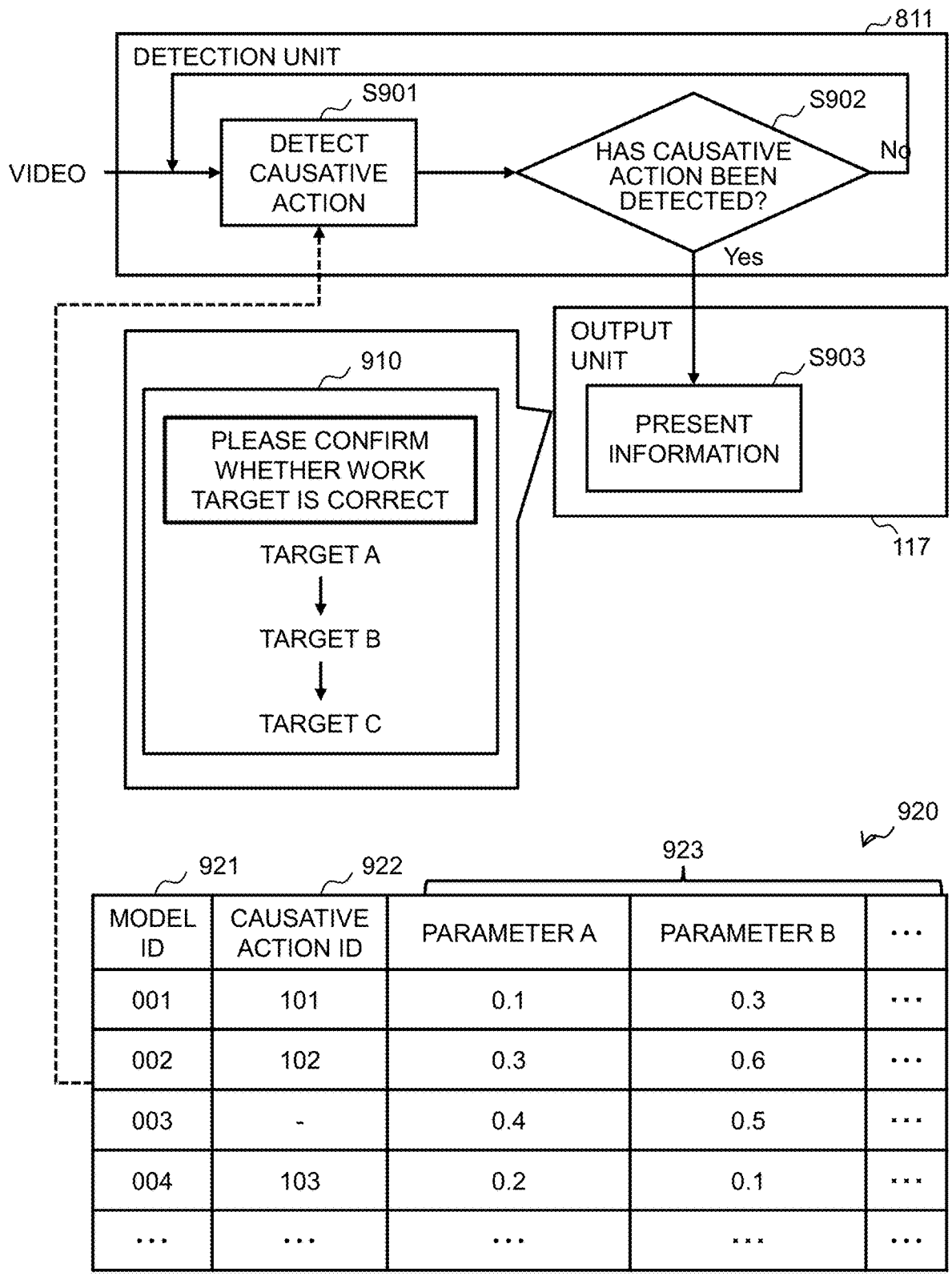
FIG. 9 is a diagram showing an example of the processing performed by the information processing device according to the third embodiment.

FIG. 9 is a diagram showing an example of the processing performed by the information processing device 810. The information processing device 810 is constantly receiving a video from the camera 101. Note that the video received by the information processing device 810 is not limited to the video acquired by the camera 101. For example, the video received by the information processing device 810 may also be the video acquired by a camera installed at the place where the worker is performing work and which records the video of such place.

The processing of S901 is started when the output unit 117 sends, to the information presentation device 102, information which instructs the work description such as "Please tighten the screw X with the screw driver Y", and is performed in predetermined intervals. Note that the processing of S901 to S903 is performed in parallel with the processing of S201 to S231.

In S901, the detection unit 811 detects the causative action by using the causative action detection model based on the video of a predetermined time received from the camera 101. For example, the detection unit 811 sequentially sets the parameters, which are stored in the causative action detection model information 812, in the causative action detection model, and detects each of the pre-registered causative actions. Here, the detection unit 811 receives, from the causative action detection model, a causative action ID as the identification information capable of identifying the detected causative action.

In S902, the detection unit 811 determines whether a causative action has been detected. When the detection unit 811 determines that a causative action has been detected, the detection unit 811 proceeds to the processing of S903. Meanwhile, when the detection unit 811 determines that a causative action has not been detected, the detection unit 811 returns to the processing of S901.

In S903, the output unit 117 sends, to the information presentation device 102, information for urging the worker to make an inquiry (hereinafter referred to as the "alert") which is provided in correspondence with the causative action ID. The output unit 117 sends the alert 901, for example, to the information presentation device 102.

Here, the causative action detection model information table 920 is an example of the causative action detection model information 812.

The causative action detection model information table 920 stores, for each causative action detection model, the parameters set in the causative action detection model. More specifically, the causative action detection model information table 920 stores information (records) in which a model ID 921, a causative action ID 922, and one or more parameters 923 are associated.

The model ID 921 is identification information capable of identifying the causative action detection model. The causative action ID 922 is identification information capable of identifying the causative action that can be determined with the causative action detection model. The parameter 923 is a parameter (for example, information indicating the weight in the neural network) that is set in the causative action detection model.

Here, erroneous work is often performed based on the worker's preconception, or in a state where the worker does not fully understand the work. With respect to this point, in this embodiment, since the worker is urged to make an inquiry when a causative action of erroneous work is detected, it is possible to avoid situations where erroneous work is performed.

(4) Fourth Embodiment

This embodiment mainly differs from the first embodiment with respect to the point that the target of inquiry is identified based on the worker's utterance. In this embodiment, any configuration that is the same as the first embodiment is given the same reference numeral, and the explanation thereof is omitted as appropriate.

Figure 10:
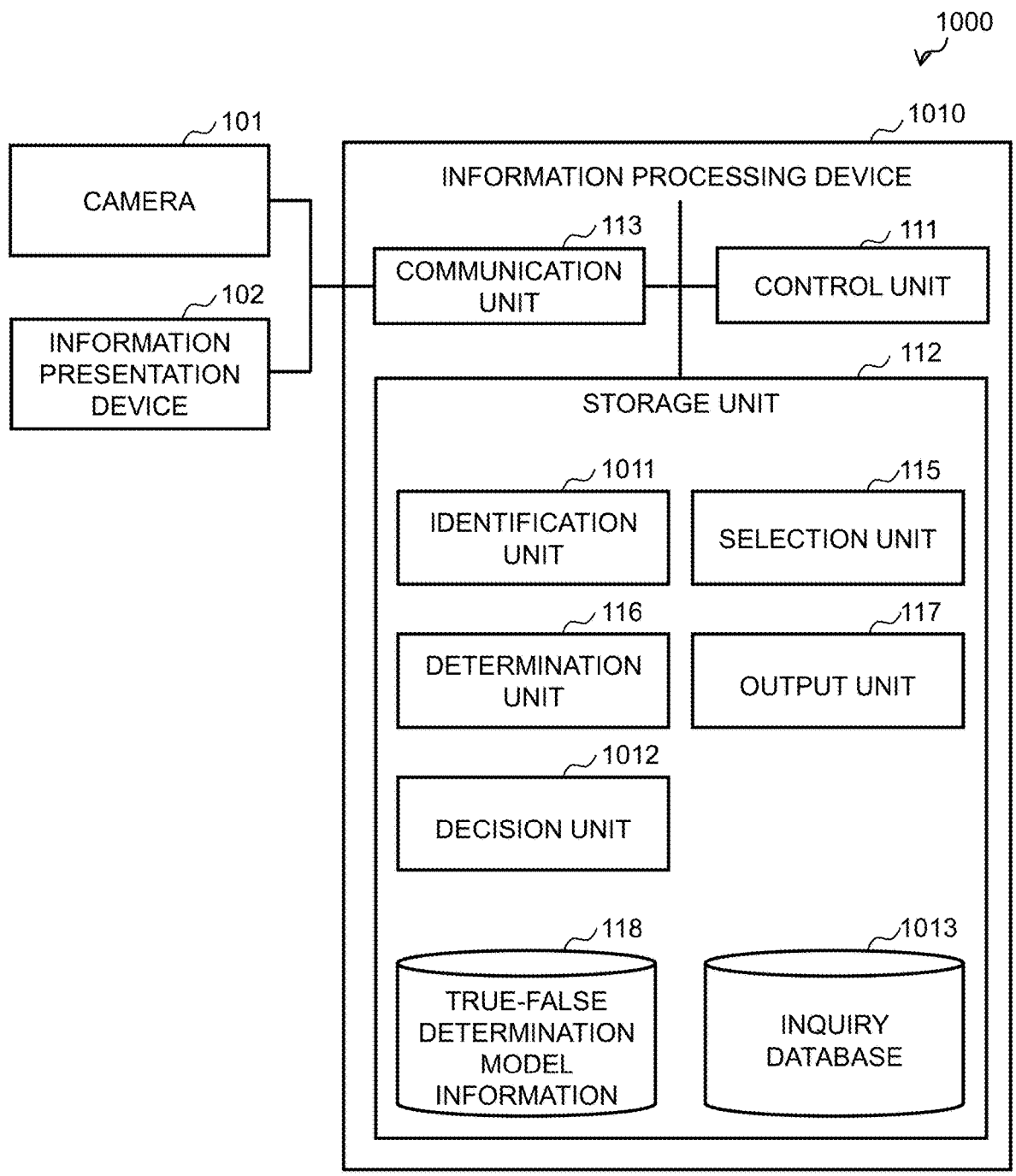
FIG. 10 is a diagram showing an example of the configuration of the work support system according to the fourth embodiment.

FIG. 10 is a diagram showing an example of the configuration of the work support system 1000 according to this embodiment.

The information processing device 1010 comprises an identification unit 1011, a decision unit 1012, an inquiry database 1013, and the like. Note that, in addition to the function of the identification unit 114, the identification unit 1011 has the function of identifying the target of inquiry based on the content of inquiry decided by the decision unit 1012.

The decision unit 1012 recognizes the worker's utterance (voice), and determines the content of inquiry based on the recognized utterance and the inquiry database 1013. The inquiry database 1013 stores the contents of utterance related to inquiries. Note that the inquiry database 1013 will be described later with reference to FIG. 12.

Figure 11:
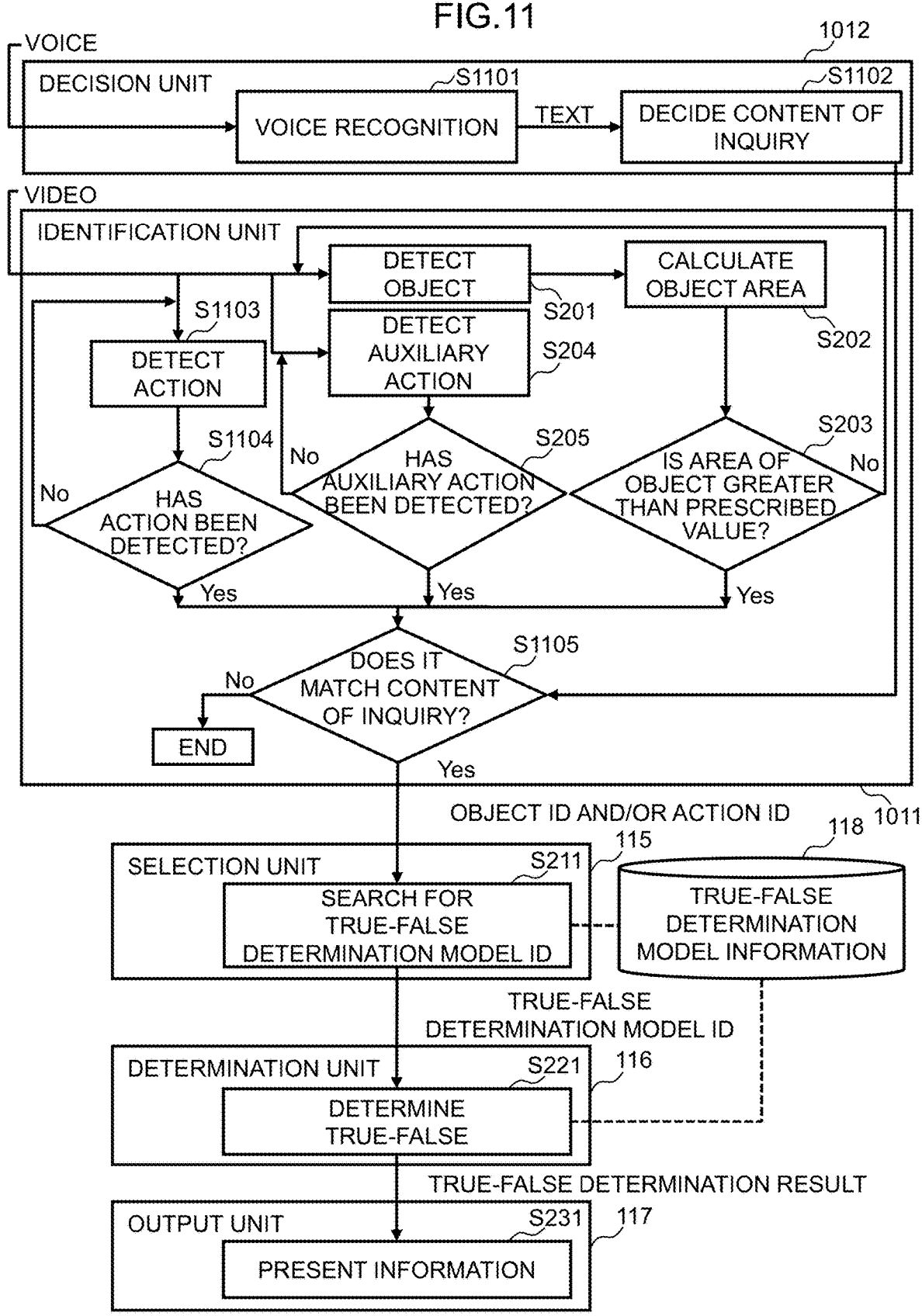
FIG. 11 is a diagram showing an example of the processing performed by the information processing device according to the fourth embodiment.

FIG. 11 is a diagram showing an example of the processing performed by the information processing device 1010. The information processing device 1010 is constantly receiving voices from the camera 101. Note that the voices received by the information processing device 1010 are not limited to the voices acquired by the camera 101. For example, the voices received by the information processing device 1010 may also be the voices acquired by a microphone installed at the place where the worker is performing work and which acquires the sounds of such place.

In S1101, the decision unit 1012 recognizes the worker's voice. For example, the decision unit 1012 converts the worker's voice into text by using the voice recognition technology which converts voice data into character data.

In S1102, the decision unit 1012 decides the content of inquiry. More specifically, the decision unit 1012 refers to the inquiry database 1013 and decides the content of inquiry corresponding to the text, and proceeds to the processing of S1105. Note that the decision unit 1012 decides, as the content of inquiry corresponding to the text, at least one among the article ID of the inquired article, the spot ID of the inquired spot, or the action ID of the inquired action.

In S1103, the identification unit 1011 detects a specific action by using the video received from the camera 101 and the specific action detection model. Here, the identification unit 1011 receives, from the specific action detection model, an action ID as the identification information capable of identifying the detected action.

The specific action detection model is provided for each specific action. The specific action detection model is, for example, a neural network such as CNN.

As the specific action, considered may be an action of using a work-related article such as turning a screw driver clockwise, or an action of using work-related equipment such as turning a valve clockwise.

In S1104, the identification unit 1011 determines whether a specific action has been detected. When the identification unit 1011 determines that a specific action has been detected, the identification unit 1011 proceeds to the processing of S1105. Meanwhile, when the identification unit 1011 determines that a specific action has not been detected, the identification unit 1011 returns to the processing of S1103.

In S1105, the identification unit 1011 determines whether the detected content (article ID, spot ID, action ID) coincides with the content of inquiry identified based on the worker's voice. When the identification unit 1011 determines that the detected content coincides with the content of inquiry, the identification unit 1011 proceeds to the processing of S211. Meanwhile, when the identification unit 1011 determines that the detected content does not coincide with the content of inquiry, the identification unit 1011 ends the processing.

Furthermore, while not shown, the storage unit 112 stores the parameters of the true-false determination model in correspondence with the action ID. In other words, when a specific action is identified as the target of inquiry, a true-false determination model capable of determining the true-false of that action is used for determining the true-false of that action.

Figure 12:
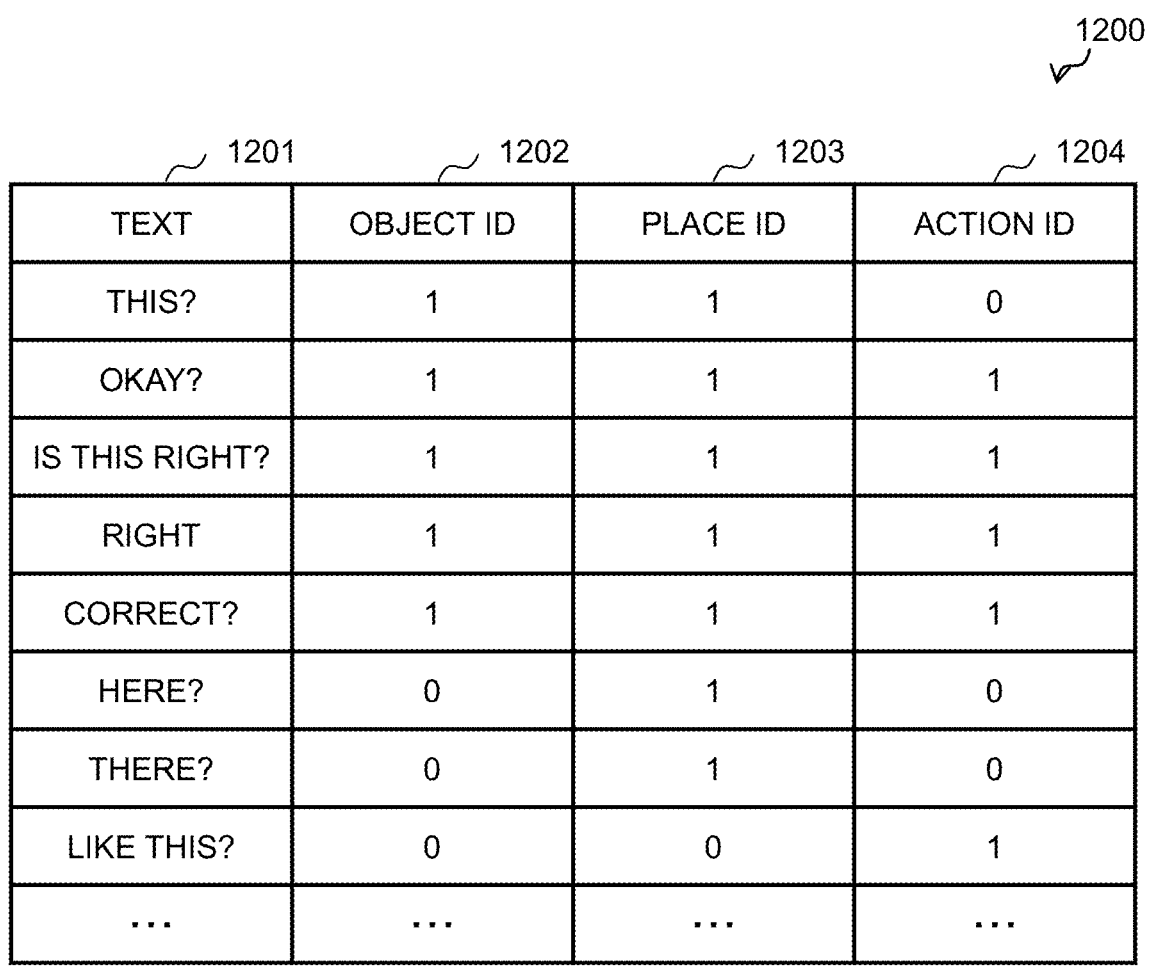
FIG. 12 is a diagram showing an example of the inquiry database according to the fourth embodiment.

FIG. 12 is a diagram showing an example (inquiry table 1200) of the inquiry database 1013.

The inquiry table 1200 stores information (records) in which a text 1201, an article ID 1202, a spot ID 1203, and an action ID 1204 are associated.

The text 1201 is text indicating the worker's utterance. The article ID 1202 is identification information capable of identifying the article related to the text. The spot ID 1203 is identification information capable of identifying the spot related to the text. The action ID 1204 is identification information capable of identifying the action related to the text.

For example, when the worker utters "Here?", the decision unit 1012 refers to the row of the text 1201 and identifies the record of the 6$^{th}$ line, and decides the article ID 1202 "0", the spot ID 1203 "1", and the action ID 1204 "0" of that record. Note that the value "1" indicates that it is the target related to the text, and the value "0" indicates that it is not the target related to the text.

Moreover, the identification unit 1011 performs the processing of S201 to S205 as well as the processing of S1103 and S1104, proceeds to the processing of S211 when only the spot ID is acquired, and ends the processing when the article ID or the spot ID is acquired.

In this embodiment, since the content of inquiry is decided based on the content of the worker's utterance and the target of inquiry which coincides with the content of inquiry is identified, the accuracy of the reply to the inquiry can be improved.

(5) Fifth Embodiment

This embodiment mainly differs from the third embodiment with regard to the point that a causative action detection model capable of detecting a causative action is created based on the worker's work history. In this embodiment, any configuration that is the same as the first embodiment is given the same reference numeral, and the explanation thereof is omitted as appropriate.

Figure 13:
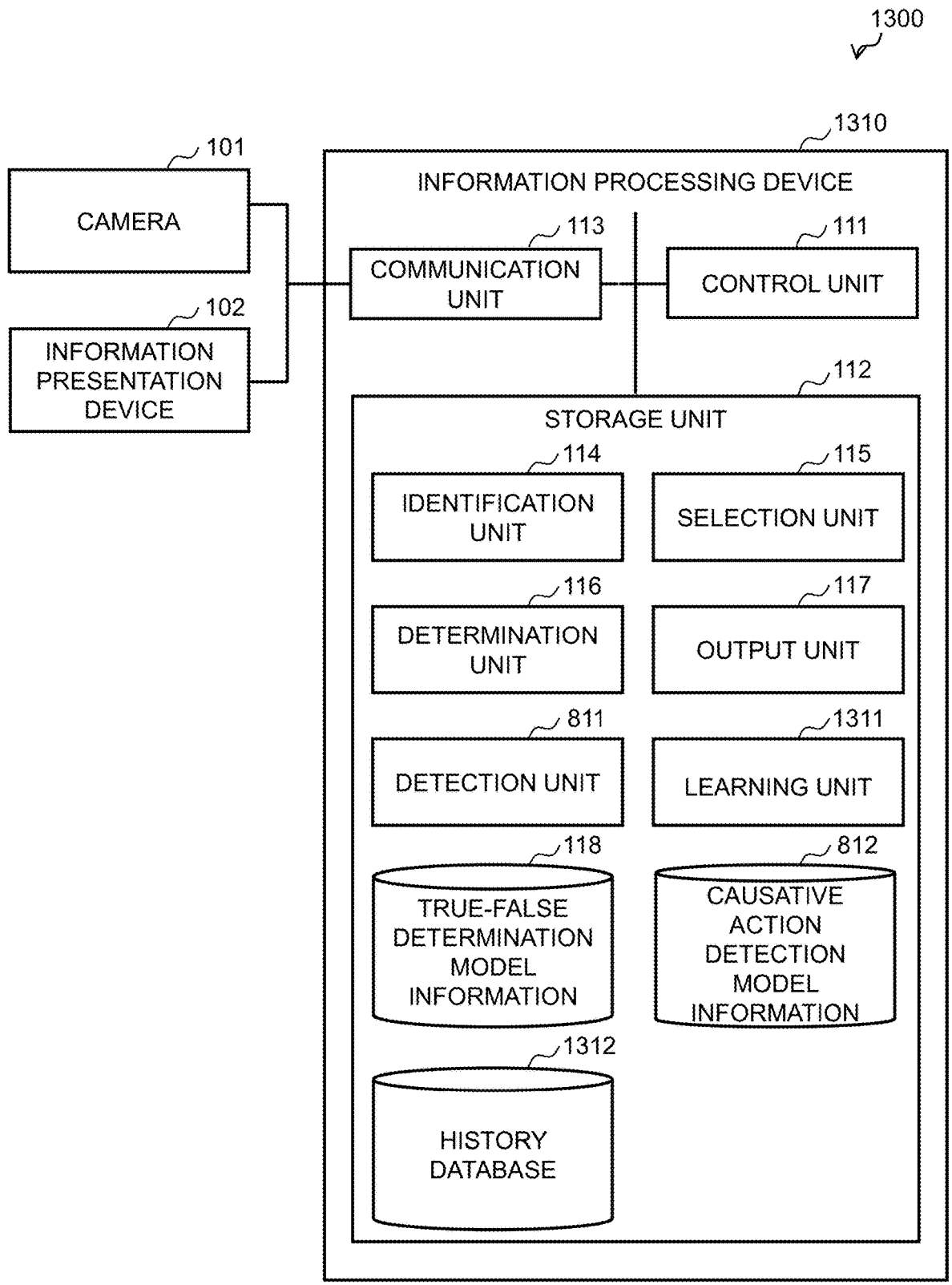
FIG. 13 is a diagram showing an example of the configuration of the work support system according to the fifth embodiment.

FIG. 13 is a diagram showing an example of the configuration of the work support system 1300 according to this embodiment.

The information processing device 1310 comprises a learning unit 1311, a history database 1312, and the like. The learning unit 1311 learns the causative action detection model by using known human behavior recognition technology based on the history database 1312. Learning of the causative action detection model may be the improvement of the detection accuracy of an existing causative action detection model, or the creation of a new causative action detection model. The history database 1312 stores information capable of identifying the video related to the erroneous work performed by the worker. Note that the history database 1312 will be explained later with reference to FIG. 14.

Note that the history database 1312 may be stored in the storage unit 112, or in another storage unit, which is different from the storage unit 112, capable of communicating with the information processing device 1310.

Figure 14:
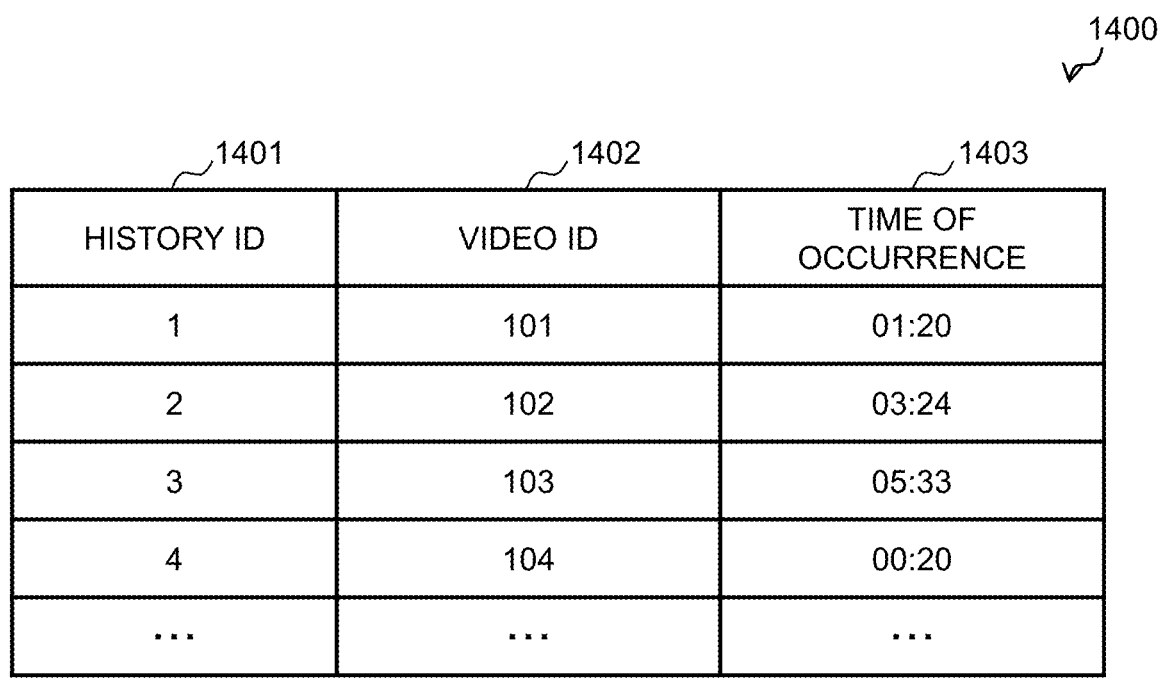
FIG. 14 is a diagram showing an example of the history database according to the fifth embodiment.

FIG. 14 is a diagram showing an example (history table 1400) of the history database 1312.

The history table 1400 stores information (records) in which a history ID 1401, a video ID 1402, and time of occurrence 1403 are associated.

The history ID 1401 is identification information capable of identifying the history of the causative action. The video ID 1402 is identification information capable of identifying the video in which the causative action was detected. The time of occurrence 1403 is information indicating the time that the causative action occurred. For example, in the learning of the causative action detection model, a video up to the time of occurrence 1403 from a predetermined time before the time of occurrence 1403 is used.

Note that the video to be used in the learning of the causative action detection model may be the video acquired by the camera 101, or the video acquired with an imaging device that is different from the camera 101. Moreover, the history database 1312 is not limited to the configuration of being provided for each causative action. For example, the history database 1312 may also comprise a causative action ID capable of identifying the causative action, and store the history of a plurality of types of causative actions.

In this embodiment, the worker can be urged to make an inquiry by learning the causative action detection model for detecting the causative action (looking away, etc.) based on the history of the accumulated erroneous work, and detecting the causative action by using the causative action detection model.

(6) Supplementary Note

The embodiments described above include, for example, the following subject matter.

While the foregoing embodiments explained a case of applying the present invention to a work support system, the present invention is not limited thereto, and may also be broadly applied to various types of systems, devices, methods, and programs.

Moreover, while the foregoing embodiments explained a case where the camera 101 is worn by the worker, the present invention is not limited thereto, and the camera 101 may also be installed in a factory, a building or the like.

Moreover, while the foregoing embodiments explained a case where one camera 101 is used, the present invention is not limited thereto, and a plurality of cameras 101 may also be used.

Moreover, while the foregoing embodiments explained a case where the information presentation device 102 is worn by the worker, the present invention is not limited thereto, and the information presentation device 102 may also be installed in a factory, a building or the like.

Moreover, while the foregoing embodiments explained a case where one information presentation device 102 is used, the present invention is not limited thereto, and a plurality of information presentation devices 102 may also be used.

Moreover, in the foregoing embodiments, the configuration of the respective tables is merely an example, and one table may be divided into two or more tables, or all or a part of two or more tables may be one table.

Moreover, in the foregoing embodiments, while the various types of data were explained using expressions such as "XX database" and "XX table" for the sake of convenience in explaining the present invention, there is no particular limitation regarding the data structure, and expressions such as "XX information" may also be used.

Moreover, in the foregoing embodiments, information of programs, tables and files which realize the respective functions may be stored in a memory, a storage device such as a hard disk or an SSD (Solid State Drive), or a recording device such as an IC card, an SD card, or a DVD.

The embodiments described above include, for example, the following characteristic configuration.

A work support system (for example, work support system 100, work support system 500, work support system 800, work support system 1000, work support system 1300) comprises an identification unit (for example, identification unit 114, identification unit 1011) which identifies a target of an inquiry (at least one of either a work-related object or a work-related action) from a worker based on a video acquired by an imaging device (for example, camera 101), a selection unit (for example, selection unit 115, selection unit 511) which selects determination model information corresponding to each of one or more targets of inquiry identified by the identification unit from a storage unit (for example, storage unit 112) storing determination model information (parameter) to be used in a determination model (for example, true-false determination model) for determining whether the target of inquiry is correct for each target of inquiry, a determination unit (for example, determination unit 116) which determines whether each of the targets of inquiry is correct by using each of the determination models in which the determination model information, which was selected by the selection unit, corresponding to each of the one or more targets of inquiry identified by the identification unit has been set in the determination model, and an output unit (for example, output unit 117) which outputs a determination result of the determination unit.

With the foregoing configuration, a target of an inquiry is detected, determination model information corresponding to the detected target of inquiry is selected, and a determination model in which the selected determination model information has been set is used to determine whether the target of inquiry is correct. According to the foregoing configuration, for example, since a worker can make an inquiry and confirm the work to be performed before actually performing the work, it is possible to avoid situations where a worker performs erroneous work. Accordingly, as a result of the work support system supporting the worker so that work is correctly performed, it is possible to reduce erroneous work, and the worker can perform work efficiently.

The selection unit, for each work, extracts one or more targets of inquiry related to work currently being performed from information (for example, work object management information 513) which prescribes one or more work-related targets of inquiry, selects targets of inquiry which are the same as the extracted one or more targets of inquiry from the one or more targets of inquiry identified by the identification unit, and selects the determination model information corresponding to each of the selected targets of inquiry from the storage unit.

With the foregoing configuration, for example, accuracy of the determination can be improved by excluding the targets of inquiry which are unrelated to the work that is currently being performed. Moreover, with the foregoing configuration, since the targets of inquiry are narrowed down, for example, the number of times that the determination is performed can be reduced, and the time required for outputting the determination result to the worker can be shortened.

The work support system of the present invention further comprises a detection unit (for example, detection unit 811) which detects a causative action of erroneous work by using the video acquired by the imaging device and a detection model (for example, causative action detection model) capable of detecting a causative action of erroneous work, wherein, when a causative action of erroneous work is detected by the detection unit, the output unit outputs information (for example, alert 910) which urges the worker to make an inquiry for confirming the work.

With the foregoing configuration, since the worker is urged to make an inquiry when a causative action of erroneous work is detected, for example, the frequency of erroneous work being performed can be reduced.

The work support system of the present invention further comprises a retaining unit (for example, storage unit 112, or a storage unit different from the storage unit 112) which retains the video related to the causative action of erroneous work, and a learning unit (for example, learning unit 1311) which learns a detection model used by the detection unit for detecting a causative action of erroneous work based on the video retained by the retaining unit.

With the foregoing configuration, since the detection model is learned based on the history of erroneous work that was performed, for example, the work support system can detect a new action that is likely to become the cause of erroneous work. Moreover, for example, with the foregoing configuration, since the detection model is learned, the worker will be urged to make an inquiry with greater accuracy, and the frequency of erroneous work being performed can be further reduced.

The work support system of the present invention further comprises a decision unit (for example, decision unit 1012) which identifies a content of an inquiry from a worker's voice, refers to information (for example, inquiry database 1013) which prescribes one or more targets of inquiry for each content of inquiry, and decides one or more targets of inquiry corresponding to the identified content of inquiry, wherein the identification unit notifies the identified one or more targets of inquiry to the selection unit when each of the one or more targets of inquiry decided by the decision unit and each of the identified one or more targets of inquiry coincide (for example, refer to S1105).

With the foregoing configuration, for example, whether the target of inquiry is in line with the content of inquiry is determined and, therefore, the accuracy of the reply to the inquiry can be improved.

In cases where the identification unit identifies a plurality of work-related objects as a target of an inquiry from a worker, when an action (for example, specific auxiliary action) of the worker for identifying a predetermined object among the plurality of objects is detected, the identification unit notifies the predetermined object to the selection unit.

With the foregoing configuration, the accuracy of determination can be improved by eliminating objects that are unrelated to the object of inquiry. Moreover, with the foregoing configuration, since the objects of inquiry are narrowed down, for example, the number of times that the determination is performed can be reduced, and the time required for outputting the determination result to the worker can be shortened.

Moreover, the foregoing configurations may be suitably changed, rearranged, combined or omitted to the extent that such change, rearrangement, combination or omission does not exceed the subject matter of the present invention.

Items included in a list according to a format of "at least one among A, B, and C" should be understood to mean (A), (B), (C), (A and B), (A and C), (B and C) or (A, B, and C). Similarly, items included in a list according to a format of "at least one among A, B, or C" should be understood to mean (A), (B), (C), (A and B), (A and C), (B and C) or (A, B, and C).

REFERENCE SIGNS LIST

100 . . . work support system, 114 . . . identification unit, 115 . . . selection unit, 116 . . . determination unit, 117 . . . output unit.

The invention claimed is:

1. A work support system, comprising:
an identification unit which identifies a target of an inquiry from a worker based on a video acquired by an imaging device;
a selection unit which selects determination model information corresponding to each of one or more targets of inquiry identified by the identification unit from a storage unit storing determination model information to be used in a determination model for determining whether the target of inquiry is correct for each target of inquiry;
a determination unit which determines whether each of the targets of inquiry is correct by using each of the determination models in which the determination model information, which was selected by the selection unit, corresponding to each of the one or more targets of inquiry identified by the identification unit has been set in the determination model;
an output unit which outputs a determination result of the determination unit;
a detection unit which detects a causative action of erroneous work by using the video acquired by the imaging device and a detection model capable of detecting a causative action of erroneous work,
wherein, when a causative action of erroneous work is detected by the detection unit, the output unit outputs information which urges the worker to make an inquiry for confirming the work,
wherein the work support system further comprises:
a retaining unit which retains the video related to the causative action of erroneous work;

a learning unit which learns a detection model used by the detection unit for detecting a causative action of erroneous work based on the video retained by the retaining unit; and a decision unit which identifies a content of an inquiry from a worker's voice, refers to information which prescribes one or more targets of inquiry for each content of inquiry, and decides one or more targets of inquiry corresponding to the identified content of inquiry, and wherein the identification unit notifies the identified one or more targets of inquiry to the selection unit when each of the one or more targets of inquiry decided by the decision unit and each of the identified one or more targets of inquiry coincide.

2. The work support system according to claim 1, wherein the selection unit, for each work, extracts one or more targets of inquiry related to work currently being performed from information which prescribes one or more work-related targets of inquiry, selects targets of inquiry which are the same as the extracted one or more targets of inquiry from the one or more targets of inquiry identified by the identification unit, and selects the determination model information corresponding to each of the selected targets of inquiry from the storage unit.

3. The work support system according to claim 1, wherein, in cases where the identification unit identifies a plurality of work-related objects as a target of an inquiry from a worker, when an action of the worker for identifying a predetermined object among the plurality of objects is detected, the identification unit notifies the predetermined object to the selection unit.

4. A work support method, comprising the steps of:

identifying, by an identification unit, a target of an inquiry from a worker based on a video acquired by an imaging device;

selecting, by a selection unit, determination model information corresponding to each of one or more targets of inquiry identified by the identification unit from a storage unit storing determination model information to be used in a determination model for determining whether the target of inquiry is correct for each target of inquiry;

determining, by a determination unit, whether each of the targets of inquiry is correct by using each of the determination models in which the determination model information, which was selected by the selection unit, corresponding to each of the one or more targets of inquiry identified by the identification unit has been set in the determination model;

outputting, by an output unit, a result determined by the determination unit;

detecting, by a detection unit, a causative action of erroneous work by using the video acquired by the imaging device and a detection model capable of detecting a causative action of erroneous work;

outputting, by the output unit, information which urges the worker to make an inquiry for confirming the work, when a causative action of erroneous work is detected by the detection unit;

retaining, by a retaining unit, the video related to the causative action of erroneous work;

learning, by a learning unit, a detection model used by the detection unit for detecting a causative action of erroneous work based on the video retained by the retaining unit; and identifying, by a decision unit, a content of an inquiry from a worker's voice, referring to information which prescribes one or more targets of inquiry for each content of inquiry, and deciding one or more targets of inquiry corresponding to the identified content of inquiry, and wherein the identification unit notifies the identified one or more targets of inquiry to the selection unit when each of the one or more targets of inquiry decided by the decision unit and each of the identified one or more targets of inquiry coincide.

5. The work support method according to claim 4, further comprising:

extracting, by the selection unit, for each work, one or more targets of inquiry related to work currently being performed from information which prescribes one or more work-related targets of inquiry, selecting targets of inquiry which are the same as the extracted one or more targets of inquiry from the one or more targets of inquiry identified by the identification unit, and selecting the determination model information corresponding to each of the selected targets of inquiry from the storage unit.

6. The work support method according to claim 4, wherein, in cases where the identification unit identifies a plurality of work-related objects as a target of an inquiry from a worker, when an action of the worker for identifying a predetermined object among the plurality of objects is detected, notifying, by the identification unit, the predetermined object to the selection unit.

* * * * *